(12) United States Patent
Dougherty et al.

(10) Patent No.: US 7,967,678 B2
(45) Date of Patent: Jun. 28, 2011

(54) COMPUTER GAME DEVELOPMENT FACTORY SYSTEM AND METHOD

(75) Inventors: Christopher Dougherty, Highland Park, IL (US); Kurt Brooks Uhlir, Chicago, IL (US); Michael V. Shuman, Chicago, IL (US)

(73) Assignee: Navteq North America, LLC, Chicago, IL (US)

( * ) Notice: Subject to any disclaimer, the term of this patent is extended or adjusted under 35 U.S.C. 154(b) by 1217 days.

(21) Appl. No.: 10/798,703

(22) Filed: Mar. 11, 2004

(65) Prior Publication Data

US 2005/0202861 A1    Sep. 15, 2005

(51) Int. Cl.
*A63F 13/00*    (2006.01)
(52) U.S. Cl. .......... 463/30; 463/6; 701/208; 703/6
(58) Field of Classification Search .......... 463/6, 9, 463/30; 701/208; 703/6
See application file for complete search history.

(56) References Cited

U.S. PATENT DOCUMENTS

| | | | |
|---|---|---|---|
| 2,026,082 A | 12/1935 | Darrow | 273/134 |
| 4,097,051 A | 6/1978 | Goldberg et al. | |
| 4,645,459 A | 2/1987 | Graf et al. | 434/43 |
| 5,184,956 A | 2/1993 | Langlais et al. | 434/69 |
| 5,526,479 A | 6/1996 | Barstow et al. | 395/152 |
| 5,566,073 A | 10/1996 | Margolin | 701/231 |
| 5,573,402 A | 11/1996 | Gray | 434/69 |
| 5,616,079 A | 4/1997 | Iwase et al. | 463/32 |
| 5,618,043 A | 4/1997 | McGlew | 273/308 |
| 5,651,676 A | 7/1997 | Artwick | 434/43 |
| 5,660,547 A | 8/1997 | Copperman | 434/29 |
| 5,823,780 A | 10/1998 | Arye et al. | 434/38 |
| 6,023,278 A | 2/2000 | Margolin | 345/419 |
| 6,146,143 A | 11/2000 | Huston et al. | 434/69 |
| 6,171,186 B1 | 1/2001 | Kurosawa et al. | 463/31 |
| 6,173,277 B1 | 1/2001 | Ashby et al. | |
| 6,183,364 B1 | 2/2001 | Trovato | 463/32 |
| 6,183,634 B1 | 2/2001 | Du Toit et al. | 201/94 |
| 6,266,614 B1 | 7/2001 | Alumbaugh | 701/211 |
| 6,268,858 B1 | 7/2001 | Nathman et al. | 345/419 |
| 6,289,276 B1 | 9/2001 | Ahrens et al. | 701/200 |
| 6,343,301 B1 | 1/2002 | Halt et al. | |
| 6,362,817 B1 | 3/2002 | Powers et al. | 345/419 |

(Continued)

FOREIGN PATENT DOCUMENTS

EP    1 107 189    6/2001

(Continued)

OTHER PUBLICATIONS

SimCity 2000 User's Manual (for PC), 1993.*

(Continued)

*Primary Examiner* — James S McClellan
(74) *Attorney, Agent, or Firm* — Adil M. Musabji; Frank J. Kozak; Jon D. Shutter

(57) ABSTRACT

A system and method are disclosed for facilitating development of computer games that depict or represent actual geographic locales or imaginary locales as part of the play scenarios of the games. A computer game factory system includes inventories of map data products, road models, 3D models, game shells, and game engines. Configuration parameters identify which components to select from the inventories to produce games for various different computer platforms. The selected components are combined with a geographic data API and geographic data tools to produce computer games.

25 Claims, 10 Drawing Sheets

U.S. PATENT DOCUMENTS

| | | | |
|---|---|---|---|
| 6,401,033 B1 | 6/2002 | Paulauskas et al. | 701/207 |
| 6,489,963 B2 | 12/2002 | Parikh et al. | |
| 6,509,869 B2 | 1/2003 | Aoyama | 342/357.13 |
| 6,612,925 B1 | 9/2003 | Forsberg | 463/6 |
| 6,677,858 B1 | 1/2004 | Faris et al. | 340/573.1 |
| 6,772,142 B1 | 8/2004 | Kelling et al. | |
| 6,961,055 B2 | 11/2005 | Doak et al. | 345/419 |
| 7,038,694 B1 | 5/2006 | Santodomingo et al. | 345/582 |
| 7,570,261 B1 | 8/2009 | Edecker et al. | |
| 2001/0034661 A1 | 10/2001 | Ferreira | |
| 2002/0063654 A1 | 5/2002 | Aoyama | 342/357.13 |
| 2002/0091005 A1 | 7/2002 | Shoji et al. | 472/65 |
| 2002/0187831 A1 | 12/2002 | Arikawa et al. | 463/32 |
| 2002/0198694 A1 | 12/2002 | Yang et al. | |
| 2003/0059743 A1 | 3/2003 | Lechner | 434/43 |
| 2003/0195023 A1 | 10/2003 | Di Cesare | 463/9 |
| 2003/0214530 A1 | 11/2003 | Wang et al. | 345/757 |
| 2003/0215110 A1 | 11/2003 | Rhoads et al. | 382/100 |
| 2004/0078263 A1 | 4/2004 | Altieri | |
| 2004/0176936 A1 | 9/2004 | Ohtsu et al. | |
| 2004/0236543 A1 | 11/2004 | Stephens | |
| 2005/0159216 A1 | 7/2005 | Chiu et al. | 463/31 |

FOREIGN PATENT DOCUMENTS

| | | |
|---|---|---|
| JP | 06202557 A | 7/1994 |
| JP | 11-057209 | 3/1999 |
| JP | 2002-282553 | 10/2002 |
| JP | 2003-000940 | 1/2003 |
| JP | 2003-023357 | 1/2003 |
| JP | 2003-305276 | 10/2003 |
| JP | 2003-329449 | 11/2003 |
| WO | WO 02/26518 A1 | 4/2002 |
| WO | WO 02/39363 A1 | 5/2002 |

OTHER PUBLICATIONS

SimCopter User's Manual, 1996.*

Photocopy of side of SimCity200 box, 1993.*

SimCity 2000 User's Manual (for Super Nintendo), 1996.* www.mapquest.com, 1997, http://web.archive.org/web/19970410221743/http://www.mapquest.com/ [PDF sent with action].* http://en.wikipedia.org/wiki/Streets_of SimCity [PDF included with office action], retrieved Jun. 16, 2009.*

3D Nature PLC, LTD.; "Comparison of features" *World Construction Set, Visual Nature Studio*, 'Online!', XP002335684, http://web.archive.org/web/20031206133238/http://www.3dnature.com/comparingfeatures.html>, entire document (Dec. 2003).

Koller et al., "Virtual GIS: A Real-Time 3D Geographic Information System", *Proceedings of 6th IEEE Visualization Conference*, XP002335667, pp. 94-100 (Oct. 1995).

*Microsoft Flight Simulator 2002 Software Development Kit*; Autogen, XP002335786, pp. 4, 6-8, http://microsoft.com/games/flightsimulator/fs2002_downloads_sdk.asp#scenery>; Apr. 2002.

Muller, Chris; Denney, Eddie; *AVSIM Commercial Scenery Review*; Real Scene U.S. Terrain Mesh Scenery for FS2002; XP002335787, entire document; http://www.aysim.com/pages/0402/realscene_terrainmesh/rs_us_tms.html; Apr. 2002.

Klaus, Todd; Terra Scene V2.0, TerraScene Scenery Generation System—Tutorials and Reference Guide; XP002335169, pp. 1-63; http://library.aysim.net/sendfile.php?; Apr. 2004.

Cable, Tim; Klaus, Todd; *AVSIM Freeware Utility Review*, Terra Scene, XP002335170, entire document, http://avsim.com/pages/0500/terrascene/terrascene.shtml> May 2000.

*3D Nature*: "What is Visual Nature Studio" EP002335442, entire document http://web/archive.org/web/20040202220153; http://wwww.3dnature.com/vnsinfo.html>, Feb. 2004.

Freedman, Jonah, *Map Quests*, XP002335320, 1 page, http://www.wired.com/wired/archive/12.02/play_pr.html> Feb. 2004.

Quick, After Him: Pac-Man WentThataway, The New York Times, Section 9—Sunday Styles, pp. 1 and 11. (May 9, 2004).

Pac Manhattan, http://pacmanhattan.com/yourcity.php, pp. 1-3, (2004).

Map Quests, Wired, p. 052 (Feb. 2004).

Game Information of True Crime: Streets of L.A., release date Aug. 1, 2003, p. 1-2, accessed online at: http://www.xbox.com/en-US/games/t/truecrimestreetsofla/ on Jan. 4, 2008.

Microsoft Flight Simulator 2004, A Century of Flight, Sybex—Official Strategies & Secrets, ISBN 0-7821-4237-0 (2003).

Stephen M. Ervin, "Landscape Visualization with Emaps", IEEE, 1993, pp. 28-33, http://ieeexplore.ieee.org/stamp/stamp.jsp?tp=&arnumber=204963 (2009).

William Cartwright, "Metaphor and Gaming and Access to Spatial Information", paper for 4th E-Mail Seminar on Cartography 2001 "Cartographic Education", pp. 1-7 www.uacq.bg/UACEG_site/sern_geoWilliam%Cartwright.doc (2009).

* cited by examiner

COMPUTER GAME DEVELOPMENT FACTORY SYSTEM AND METHOD

REFERENCE TO RELATED APPLICATIONS

The present application is related to copending patent applications entitled "METHOD AND SYSTEM FOR USING GEOGRAHIC DATA IN COMPUTER GAME DEVELOPMENT" Ser. No. 10/798,459, "APPLICATION PROGRAMMING INTERFACE FOR GEOGRAPHIC DATA IN COMPUTER GAMES", Ser. No. 10/798,531, and "GEOGRAPHIC AREA TEMPLATES FOR COMPUTER GAMES", Ser. No. 10/798,632, the entire disclosures of which are incorporated by reference herein.

BACKGROUND OF THE INVENTION

The present invention relates to a system and method that facilitate development of computer games and more particularly, a system and method that facilitate development of computer games that include representations of geographic areas, including such features as the road networks in the geographic areas.

Computer games have developed in sophistication and commercial importance. Improvements in computer hardware and software have enabled computer games to provide realistic graphics and sound. With these advances, computer game users have come to expect that games meet high standards for richness and attention to detail. Some computer games, such as road race games, represent real world places as part of the playing scenarios of the games. With these types of games, users expect convincing depictions of the real world with attention to accuracy and detail.

Computer game developers have recognized the need to provide realistic depictions of actual real world places in computer games. This has placed a burden on computer game developers to obtain the data needed to portray geographic places with realistic detail and accuracy. The collection of such detailed geographic data about real world roads, places, etc., is time-consuming and expensive. Further, the collection of detailed real world data diverts the resources of computer game developers away from other important aspects of computer game creation, such as characters, story lines, and strategies. Thus, there exists a need to facilitate the collection and use of geographic data by game developers.

Another consideration related to the development of computer games that depict geographic places relates to providing a variety of different locales. Even if a computer game developer collects all the data needed to depict a particular real world locale (such as a city) with the richness and detail expected by game players, the game play scenario is limited to only that particular locale. This may limit the appeal of the computer game. Therefore, it may be advantageous for a computer game developer to provide games that depict a variety of different real world locales. However, if a computer game developer wants to provide a game with different real world locales, the developer is required to collect geographic data for each different locale, thus incurring further considerable expense.

Still another consideration related to the development of computer games that depict geographic places concerns providing games on a variety of different hardware platforms. There exist a variety of different hardware platforms on which computer games are played. These different hardware platforms have different resources, such as memory, processor speed, user interface, etc. In addition, there are multi-player games that can involve a variety of different platforms intended to work together. Developing games that utilize the available resources of different computer platforms also presents a challenge to game developers.

Accordingly, it is an objective to provide ways to make computer games that represent actual real world places.

It is another objective to facilitate the representation of actual physical real world places or imaginary places in computer games.

SUMMARY OF THE INVENTION

To address these and other objectives, the present invention includes a system and method for facilitating development of computer games that depict or represent actual geographic locales or imaginary locales as part of the play scenarios of the games. A computer game factory system includes inventories of map data products, road models, 3D models, game shells, and game engines. Configuration parameters identify which components to select from the inventories to produce computer games for various different computer platforms. The selected components are combined with a geographic data API and geographic data tools to produce computer games.

DETAILED DESCRIPTION OF THE PRESENTLY PREFERRED EMBODIMENTS

I. Source Geographic Database

The embodiments disclosed herein relate to computer games that depict real or imaginary geographic locales as part of the play scenarios of the computer games. For example, the play scenarios may involve a car chase through the streets of Miami, Fla., a treasure hunt through the countries of Europe, a flight simulator game over Texas, and so on. Game play scenarios may also involve imaginary places, such as a southern California-style city. Game play scenarios may also involve playing in real world places in time periods other than the current (e.g., London 1500 A.D. or Chicago 2150 A.D.). In the embodiments disclosed herein, geographic data used in the computer games is obtained from a map data developer (also referred to as a "geographic database developer" or the like). In these embodiments, the map data developer collects, confirms, updates, processes and distributes geographic data for other, non-game related purposes, such as navigation-related purposes.

Figure 1:
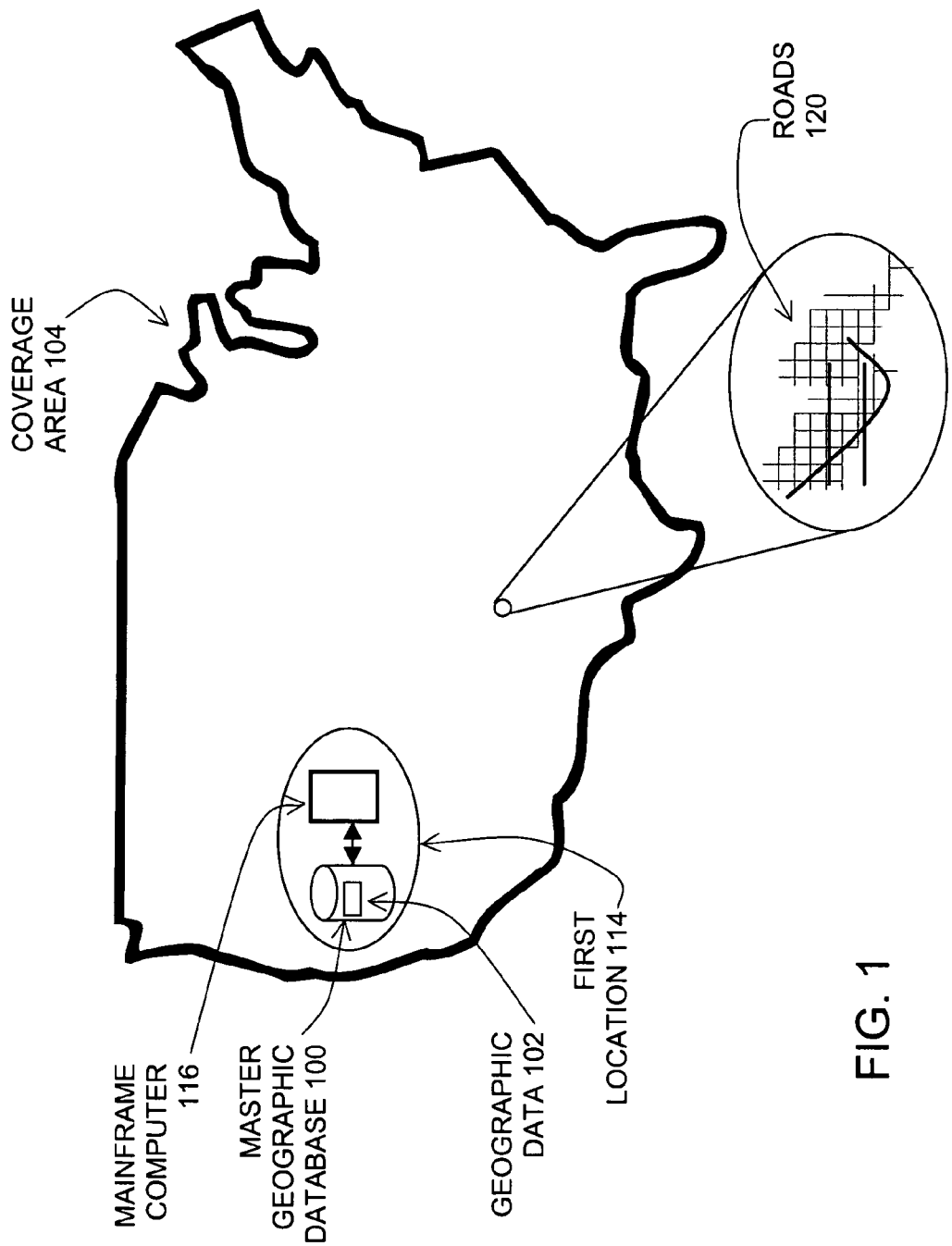
FIG. 1 is a diagram that illustrates a relationship between a master version of a geographic database and a coverage area.

FIG. 1 shows a master or source version of a geographic database 100. The master version of the geographic database is owned and developed by a geographic database developer 101. (Although only one source database and geographic database developer are shown, the embodiments disclosed herein are not limited to only a single source database or a single geographic database developer.) The master version of the geographic database 100 contains data 102 (also referred to a "geographic data" or "spatial data") that represent geographic features in a coverage area 104. The coverage area 104 may correspond to an entire country, such as the United States. Alternatively, the coverage area 104 may correspond to several countries, such as the United States, Canada, and Mexico, or France, Germany, and Italy, and so on. According to another alternative, the coverage area 104 of the master version of the geographic database 100 may represent only a single region within a country, such as the West Coast or the Midwest of the U.S. Although the master version of the geographic database 100 includes data that represent geographic features in the entire coverage area 104, there may be parts of the coverage area 104 that contain geographic features that are not represented by data in the geographic database, or for which the representation of geographic features is sparse.

The master version of the geographic database 100 includes data about a road network 120 located in the coverage area 104. The data about the road network 120 include various kinds of information, such as the geographic coordinates of positions of the roads, street names of the roads, addresses ranges along the roads, turn restrictions at intersections of roads, and so on. The master version of the geographic database 100 also includes data about points of interest in the covered area 104. Points of interest may include hotels, restaurants, museums, stadiums, offices, automobile dealerships, auto repair shops, etc. The master version of the geographic database 100 may include data about the locations of these points of interests. The master version of the geographic database 100 may also include data about places, such as cities, towns, or other communities, and other geographic features, such as bodies of water, mountain ranges, etc. The master version of the geographic database 100 may include other kinds of information.

There are different ways used by the geographic database developer to collect data. These ways include obtaining data from other sources, such as municipalities. In addition, the geographic database developer may employ field personnel to travel by vehicles along roads throughout the geographic region to observe features and record information about them. The data collected by the geographic database developer are stored in the master version of the geographic database 100.

The geographic database developer 101 continues to collect data that represent the features in the geographic coverage area 104 on an ongoing basis. One reason that the geographic database developer continues to collect data is that the features in the coverage area 104 change over time. Accordingly, the geographic database developer collects data about the same features in order to update or confirm the previously collected data about the features. Another reason that the geographic database developer continues to collect data is to expand the coverage and/or detail of the master version of the geographic database 100. For example, at one point in time the master version of the geographic database 100 may include data that represents only a portion of the entire coverage area 104. After that point in time, the geographic database developer collects data about features in areas that were not previously represented in order to expand the coverage of the master version of the geographic database 100.

The master version of the geographic database 100 is maintained as the copy that has the most up-to-date data relating to the coverage area 104. Accordingly, the master version of the geographic database 100 is updated, expanded, and/or otherwise modified on a regular and continuing basis. To facilitate these operations, the master version of the geographic database 100 is stored in a format that facilitates updating, maintenance, and development. For example, the data in the master version 100 may be uncompressed. Examples of suitable formats include the VSAM format and the GDF format, although other kinds of formats, both proprietary and non-proprietary, may be suitable. In general, the format of the master database 100 is not suitable for use in navigation systems.

A copy of the master version of the geographic database 100 is physically located at a first location 114. In one embodiment, the master version of the geographic database 100 is stored on one or more hard drives, tapes or other media, and accessed with an appropriate computer 116. Any suitable computer may be used, such as a mainframe computer, a plurality of networked microcomputers, etc.

Figure 2:
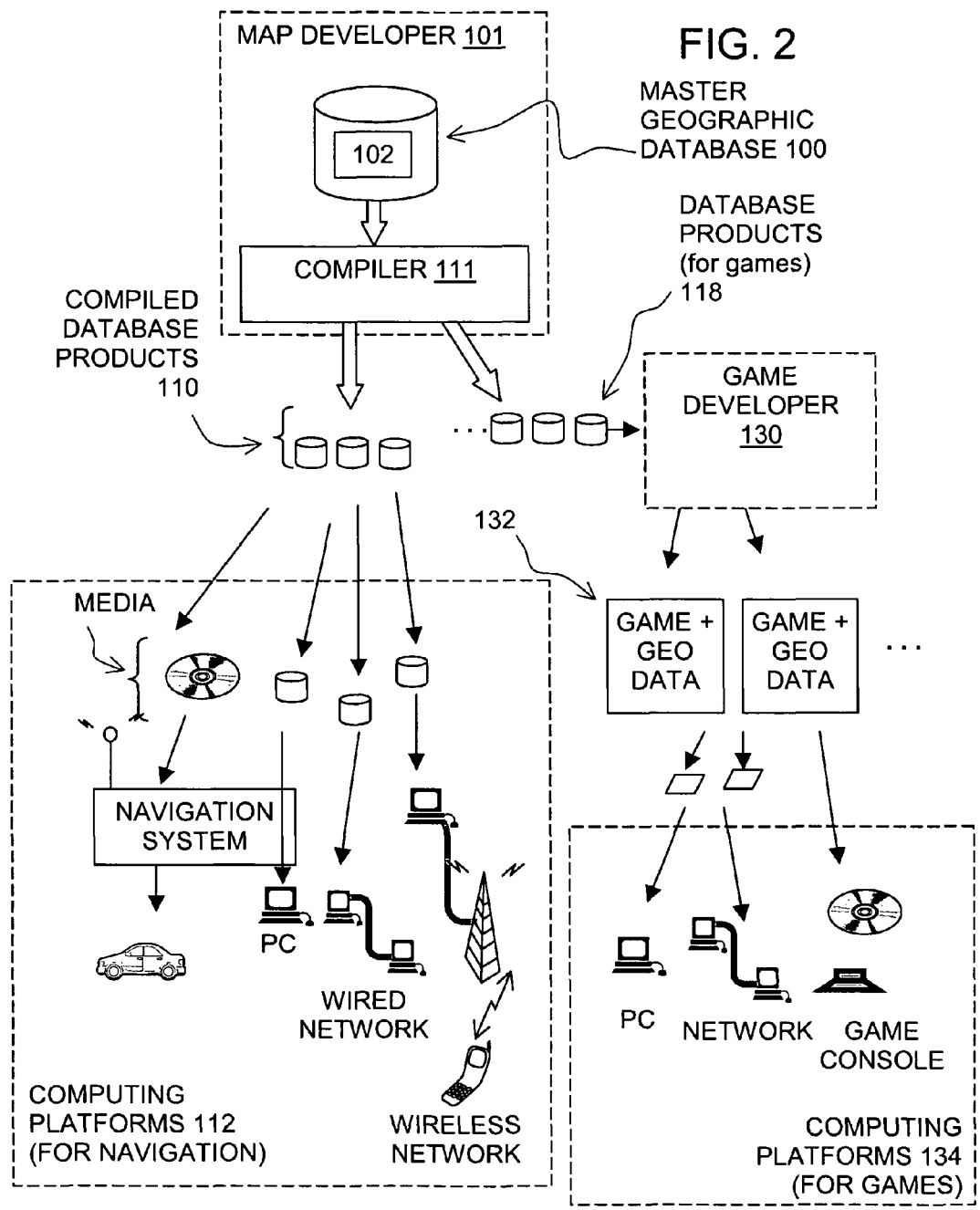
FIG. 2 is a block diagram showing a first embodiment of a system for facilitating use of geographic data in developing computer games.

Referring to FIG. 2, the master version of the geographic database 100 is used to make database products 110 for navigation purposes and database products 118 for computer games. The database products 110 and 118 are made using a compiler 111. The compiler 111 is a software program run on an appropriate computer platform. In the present embodiment, the database products 118 used for computer games are made using the same compiler used to make geographic databases 110 used for navigation purposes. In alternative embodiments, separate compilers are used to make the map database products 110 used for navigation purposes and the map database products 118 used for computer games.

The database products 110 and 118 may include only portions of all the data in the master version of the geographic database 100. For example, the database products 110 and 118 may include data that relate to only one or more specific sub-areas within the coverage area 104 of the master version of the geographic database 100. Further, the database products 110 and 118 may include fewer than all the data attributes that describe geographic features represented in the master version of the geographic database 100.

The database products 110 and 118 are used on various kinds of computing platforms. The computing platforms 112 used for navigation purposes include in-vehicle navigation systems, hand-held portable navigation systems, personal computers (including desktop and notebook computers), and other kinds of devices, such as personal digital assistant (PDA) devices, pagers, telephones, cell phones, etc. The compiled database products 110 are also used on networked computing platforms and environments, including systems connected to the Internet.

The database products 110 that are used for navigation purposes are stored on suitable media in their respective computing platforms. For example, the database products 110 may be stored on CD-ROM disks, hard drives, DVD disks, flash memory, or other types of media that are available now or that become available in the future.

On the computing platforms 112 used for navigation, the database products 110 are used by various software applications. For example, the database products 110 may be used by software applications that provide navigation-related functions, such as route calculation, route guidance, vehicle positioning, map display, and electronic yellow pages, as well as other kinds of functions.

As stated above, in addition to producing database products 110 for use in computing platforms used for navigation, the geographic database developer 101 produces database products 118 for use in computer games. The database products 118 are provided to one or more computer game developers 130 (only one of which is shown in FIG. 2). The database product 118 used by the computer game developer 130 may be the same or similar to the database products 110 used for navigation. The database products 118 used by the computer game developer 130 may be provided on a suitable media, such as one or more CD-ROM disks, DVD disks, or hard drives. Alternatively, the database products 118 used by the computer game developer 130 may be provided over a network connection.

The computer game developer 130 uses data from the geographic database products 118, along with other data and components (as explained below), to create one or more computer games 132. The computer games 132 created by the computer game developer 130 may include some or all the data from the database products 118. Alternatively, the computer games 132 may include data derived from or based on the data from the database products 118. The geographic data in the computer games 132 may be in a different format than the data contained in the database products 118.

The computer games 132 created using the data from the database products 118 provide for representing geographic features in play scenarios of the computer games. The geographic features represented in the computer games 132 produced using the database products 118 include features located in the respective coverage areas of the database products 118. These geographic features may include some or all the road networks represented by the geographic databases 118. The computer games 132 are installed on appropriate computer platforms 134. The computer platforms 134 on which the computer games 132 are installed may include personal computers, game consoles, PDAs, handheld game devices, mobile phones, networked computers, and so on. Users access the computer games 132 on the computer platforms 134 to play.

II. Computer Games Factory System

Figure 3:
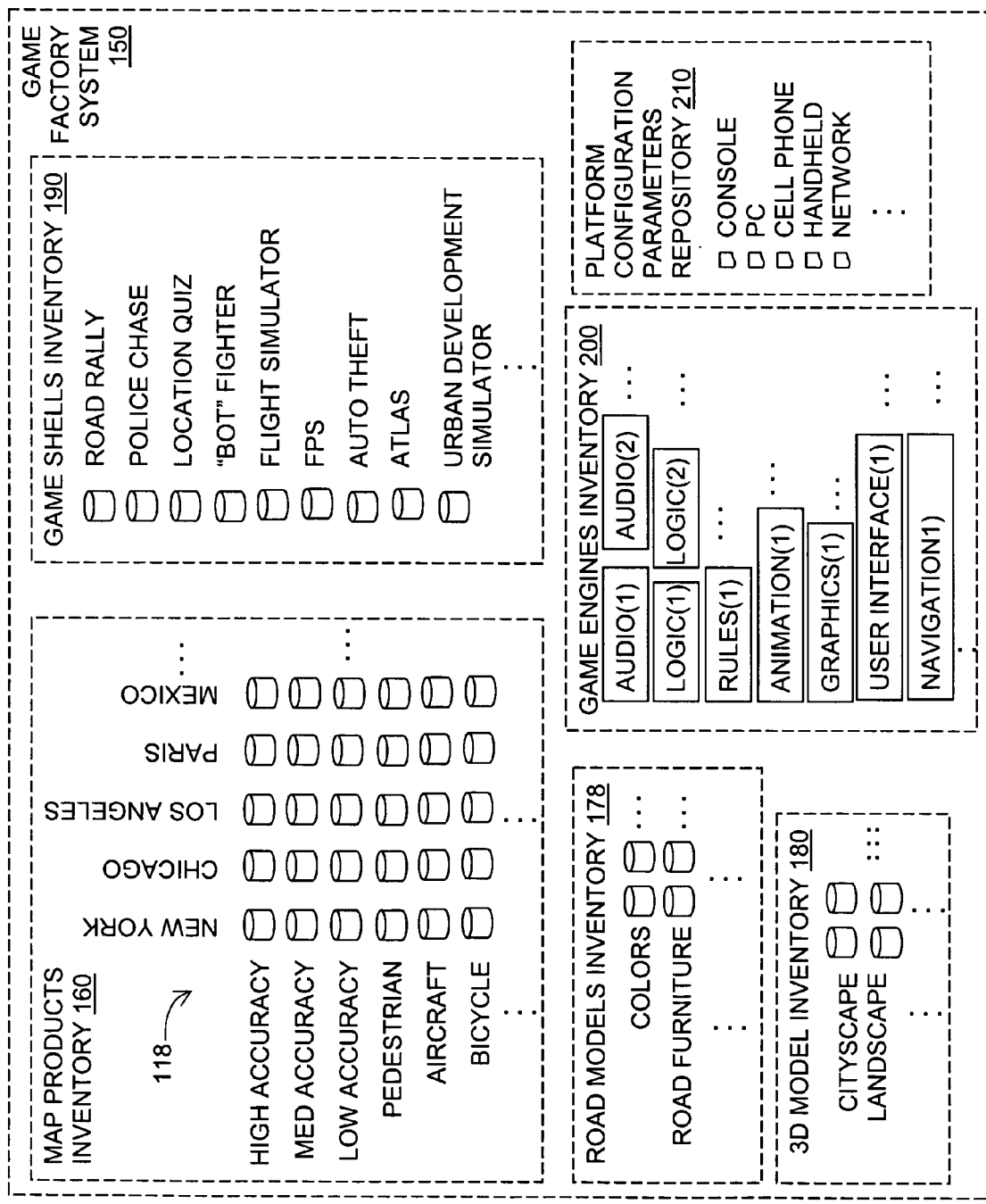
FIG. 3 is a block diagram showing components of a system used by the computer game developer of FIG. 2.

FIG. 3 shows a system 150 used by the computer game developer (130 in FIG. 2) for creating computer games 132 that use geographic data to depict locales as part of the playing scenarios of the games. In FIG. 3, the game development system 150 includes several inventories. In the embodiment of FIG. 3, the game development system 150 includes a map products inventory 160, a road models inventory 178, a 3D models inventory 180, a game shells inventory 190 and a game engines inventory 200. In addition, the game development system 150 includes a platform configuration parameters repository 210.

The map products inventory 160 includes the database products 118 for games provided by the map data developer 101. In the embodiment of FIG. 3, the map products inventory 160 includes a plurality of the different map database products 118. The map database products 118 include representations of geographic features in different locales. The types of geographic features that are represented include, for example, the road networks, points of interest, lakes, administrative boundaries, and other geographic features. In the embodiment of FIG. 3, the map products inventory 160 includes separate map products 118 (i.e., geographic databases) that represent the road networks and other geographic features in different geographic locales. For example, the map products inventory 160 includes geographic database products that represent the different locales of New York, Chicago, Los Angeles, and Paris. (There may be map products that represent various other locales in addition to these.) Furthermore, for some of the locales, the map products inventory 160 includes separate map products that represent features in that locale differently. For example, for some of the locales there are separate database products that represent the features with high accuracy, with medium accuracy, with low accuracy, for pedestrians, for aircraft, and for bicycles. (There may be map products that represent various other types in addition to these.) The high accuracy database products include a relatively large amount of detail about the geographic features in the respective locales and also represent the geographic features relatively accurately. The medium accuracy database products include a relatively lesser amount of detail about the geographic features in the respective locale and represent the features with a relatively lower accuracy. The low accuracy database products include an even lesser amount of detail about the geographic features in the respective locale and represent the features with an even relatively lower accuracy. The pedestrian database products include geographic data pertinent to travel on foot in the respective locale. For example, the pedestrian map database products include information about sidewalks, footpaths, hiking trails, etc., but may not include information about expressways. The aircraft database products may include information about terrain, airport runways, building heights, etc., but may exclude street names, address ranges, etc. The bicycle database products may include information about bike paths, etc., but exclude airport runways. As stated above, there may be map products for many other locales and many other types of map products in the map products inventory 162.

Figure 4:
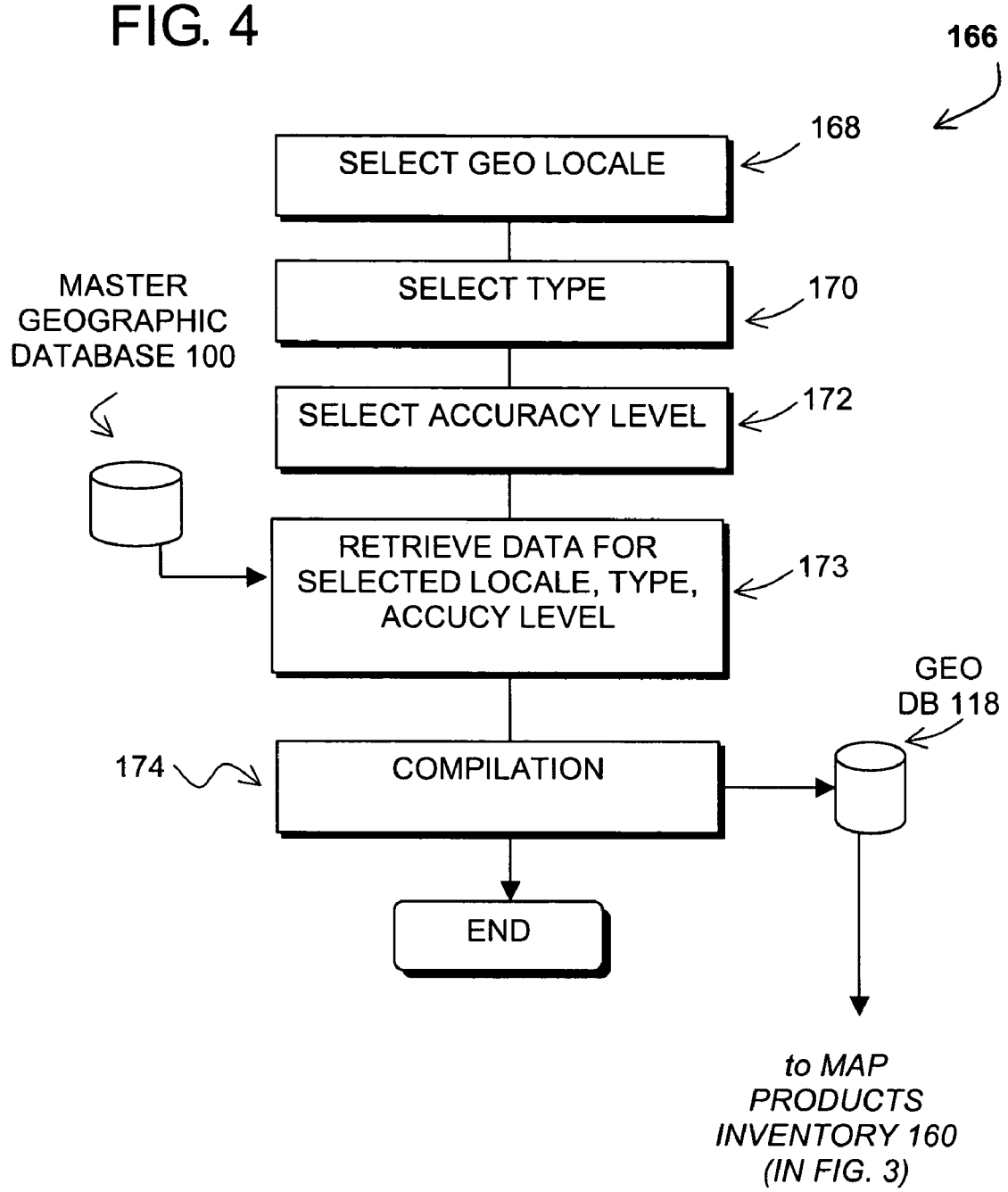
FIG. 4 is a flowchart showing steps in a process for making the map data products shown in FIG. 3.

FIG. 4 shows a process 166 for forming the different map database products 118 used for computer games. In the present embodiment, the process 166 is performed by the map developer 101. Alternatively, the process 166 may be performed by the game developer 130 or by another party.

In a first step of the process 166, a geographic locale is selected (Step 168). The locale may be a metropolitan area, a state, province, or country. Alternatively, the locale may be an arbitrarily defined area, e.g., an area defined by specified geographic boundaries.

After the locale is selected, a type is selected (Step 170). The type may include standard (auto), pedestrian, aircraft, bicycle, etc. Other types may be defined.

After the type is specified, an accuracy level is selected (Step 172). Levels may be specified in general terms (e.g., "high", "medium" or "low") or specific terms (e.g., 1 meter, 5 meter, 100 meter).

Once the locale, type, and accuracy levels are specified, data are retrieved from the master geographic database 100 that match the specified criteria (Step 173). For example, a spatial query is used to identify and retrieve data records that represent geographic features located in the specified locale. Similarly, other queries are used to limit the retrieved data to only those records of the specified type and accuracy.

Once the data that meet the specified criteria have been obtained from the master database 100, the data are organized into an appropriate format (Step 174). This may include compiling the data into a format in which it can be accessed and used in a computer game running on a given hardware platform. This process may include the formation of new types of data, the addition of indexes, parcelization, spatial organization and compression. Processes for forming a compiled database product are described in U.S. Pat. Nos. 5,974,419, 5,953, 722, 5,968,109 and 6,047,280, the entire disclosures of which are incorporated by reference herein.

(In addition to including map database products that represent actual, real world locales, the map products inventory may include map products that represent imaginary locales. These imaginary locales may be produced using the embodiments described in the copending application entitled "GEOGRAPHIC AREA TEMPLATES FOR COMPUTER GAMES", Ser. No. 10/798,632, the entire disclosure of which is incorporated by reference herein.)

Referring again to FIG. 3, the game factory system 150 also includes the road models inventory 178. The road models inventory 178 includes a plurality of road model databases. The data in the road model databases include representations used for visual appearance and rendering of road-related things, such as road colors, road pavement, lane stripes, curbs, sidewalks, signs, lampposts, lane dividers, traffic signals, speed bumps, crosswalks, and so on. When forming a computer game, these road model representations are associated with the data representation of the road network obtained from one of the geographic databases 118. The reason for this is that the data in the geographic database 118 is (or is derived from) a representation of a road network used for navigation. As such, the data in the geographic database 118 may not indicate what roads, or things associated with a road, look like. For example, in the geographic database 118, a data representation of a road may indicate the locations (e.g., geographic coordinates) of intersections, and possibly the locations of points along a road segment between intersections, the legal (and illegal) connections between roads, the names of roads, the addresses ranges along roads, the type of road surface, and so on. However, in the geographic database 118, a data representation of a road may not contain information that indicates the actual visual shapes, colors, dimensions, etc., of these road-related things. For example, in the geographic database 118, a data representation of a road may not indicate the colors of a road, curbs, sidewalks, what a sign looks like, and so on. The road model databases include these types of information.

The data representations of road-related things in the road models database are also used for providing other properties of the represented things, such as the physical and audio properties. For example, causing a simulated vehicle to move over a simulated curb causes the simulated vehicle to "bump." Similarly, a simulated vehicle "hitting" a simulated lamppost causes a simulated crashing sound.

Each road model database may include a variety of different data models for some types of road-related things. For example, a road models database include several different types of traffic signal configurations. These different types of traffic signal configurations are used to provide variety and to make the representation of the road network appear more realistic, i.e., so that all the traffic signal configurations do not look the same.

The road models inventory 178 includes a plurality of different road model databases. Each of these different road models databases includes models that are appropriate for a different type of locale. For example, a road models database for London will include data models for the way road signs look in London, whereas a road models database for New York will includes data models for the way road signs look in New York. Similarly, a road models database for an aircraft simulator game will include models for the way airports look from overhead, whereas a road models database for a pedestrian game will include data models for the way an airport looks on foot.

The 3D model inventory 180 includes a plurality of 3D model databases. The 3D model data in the 3D model databases includes representations used for visual appearance and rendering of cityscape and landscape-related things, such as buildings, fences, trees, shrubbery, lawns, fences, clouds, scenery, and so on. Like the road models, these 3D model representations are associated with locations along the road network data as represented by data from the geographic database 118. Furthermore, like the road models databases, there are a plurality of 3D models databases that include 3D models appropriate for different types of locales. For example, a 3D models database for Paris will include 3D data models for the way buildings look in Paris, whereas a 3D models database for Texas will include data models for the way buildings look in Texas.

The data representations of cityscape and landscape-related things in the 3D models database are also used for providing the other properties (e.g., physical and audio) of the represented things. For example, causing a simulated vehicle to strike a simulated building causes the simulated vehicle to stop and make a crashing sound. As another example, a simulated vehicle can drive over a simulated shrub, but not a simulated tree.

The game shells inventory 190 includes a plurality of different game shells. A game shell is a data structure and/or program that includes the basic logic, rules, strategy, characters, vehicles, etc., for a game. In the embodiment of FIG. 3, the game shells include a road rally game shell, a police chase game shell, a location quiz game shell, a "bot" fighter game shell, a flight simulator game shell, a "first-person-shooter" game shell, an auto theft game shell, and an urban development simulator game shell. There may be other type of game shells in addition to these.

The game factory system 150 also includes a game engines inventory 200. The game engines inventory 200 includes a plurality of different game engines. Game engines are software programs (e.g., including applications or routines and/or their associated libraries) that are included inside (made a part of) the computer game. In general, the game engines perform specific, regularly performed tasks and operate on an as-needed basis (e.g., continuously) during game play. A game engine program may run continuously waiting to receive some input (e.g., from another program, from a game player, etc.) and, in response to the input, may change some output. Examples of game engines include audio engines, logic engines, rules engines, animation engines, graphics engines, user interface engines, navigation engines (application) and so on. The game engines inventory 200 includes several different engines of a given type. For example, there are several different audio engines, several different graphics engines, etc. The navigation engines include applications that make specific use of geographic data, such as a route calculation application that determines a route for part of a play scenario of the game. Each of these different engines of a given type is suitable for a different kind of computer platform and/or game shell. For example, an audio engine for a game to be played on a personal computer may be more robust and sophisticated than an audio engine for a game to be played on a cell phone. Even though there may be several different engines of a given type, each of these different engines of a given type may share some components, functions, etc.

The game factory system 150 also includes the platform configuration parameters repository 210. The platform configuration parameters repository 210 includes a plurality of entries specifying configuration parameters for different computer platforms. FIG. 3 shows several general categories of computer platforms in the platform configuration parameters repository 210. These general categories include PC (personal computers), game consoles, cell phones, hand held devices, and networks. (The platform configuration parameters repository 210 may include additional categories.) Within each category, the platform configuration parameters repository 210 includes entries for different computer platforms of the type corresponding to that category. Each entry matches an associated computer platform with one or more game shells, one or more map product types, one or more game engines, one or more road models, and one or more 3D models. Each of the entries in the platform configuration repository is matched with suitable components from each inventory based on the hardware and software resources of the associated platform.

III. Operation of the Computer Games Factory System

Figure 5:
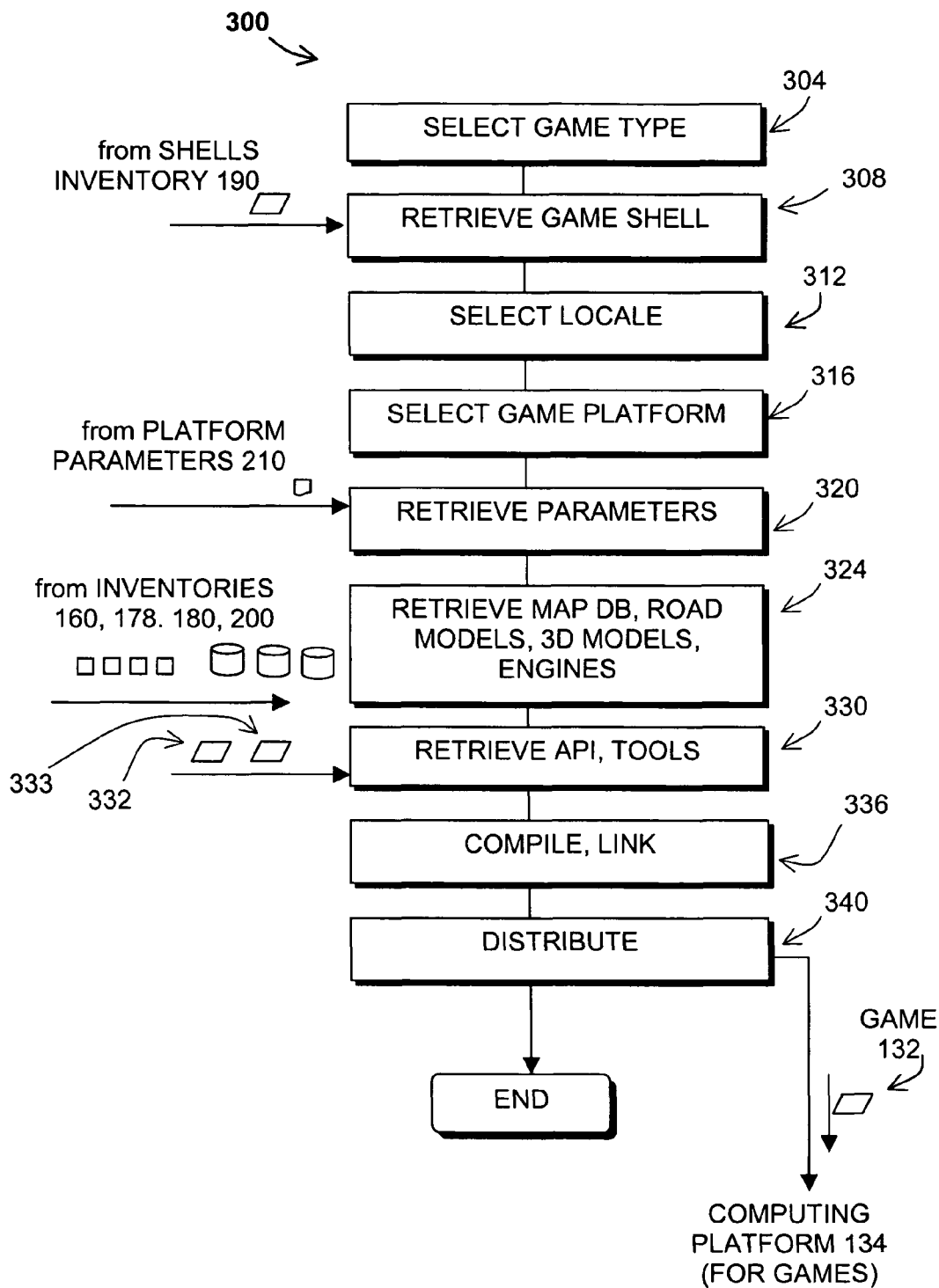
FIG. 5 is a flowchart showing steps in a process for making computer games using the system of FIG. 3.

FIG. 5 shows a process 300 for forming a computer game using the game factory system 150 of FIG. 3. In this embodiment, the process 300 is performed by the computer game developer (130 in FIG. 2) but in alternative embodiments the process may be performed by another party. The process 300 may be performed automatically (e.g., by a computer program) or may be performed manually by a human operator (who may be operating a computer) or by a combination of automatic steps and manual steps.

In a first step of the process 300, a game type is selected (Step 304). The game type is selected from the types for which a game shell exists in the game shells inventory 190 in FIG. 3. The game shell data structure corresponding to the selected type is retrieved from the game shells inventory 190 (Step 308).

Next, a locale is selected (Step 312). The locale is selected from the available locales represented by map products in the map products inventory 160 in FIG. 3.

Next, a platform is selected (Step 316). The platform is selected from the available platforms listed in the platform configuration parameters repository 210 in FIG. 3. The entry in the platform configuration parameters repository 210 that corresponds to the selected type of platform is retrieved (Step 320).

Based on the parameters information in the platform configuration entry about the requirements of the selected platform and the selected locale, appropriate selections are retrieved from the map database inventory 160, the road models inventory 178, the 3D models inventory and the game engines inventory 200 (Step 324). In addition to these selections, a geographic data API (application programming interface) 332 and geographic tools programs 333 are retrieved (Step 330). These components are combined (e.g., compiled and/or linked together) to form the computer game 132 (Step 336). In the computer game product, the geographic data may be integrated into the code base or may exist separately. The computer game 132 is distributed (and/or sold or licensed) to end users (Step 340).

IV. Computer Game Structure and Operation

A. Overview

Figure 6:
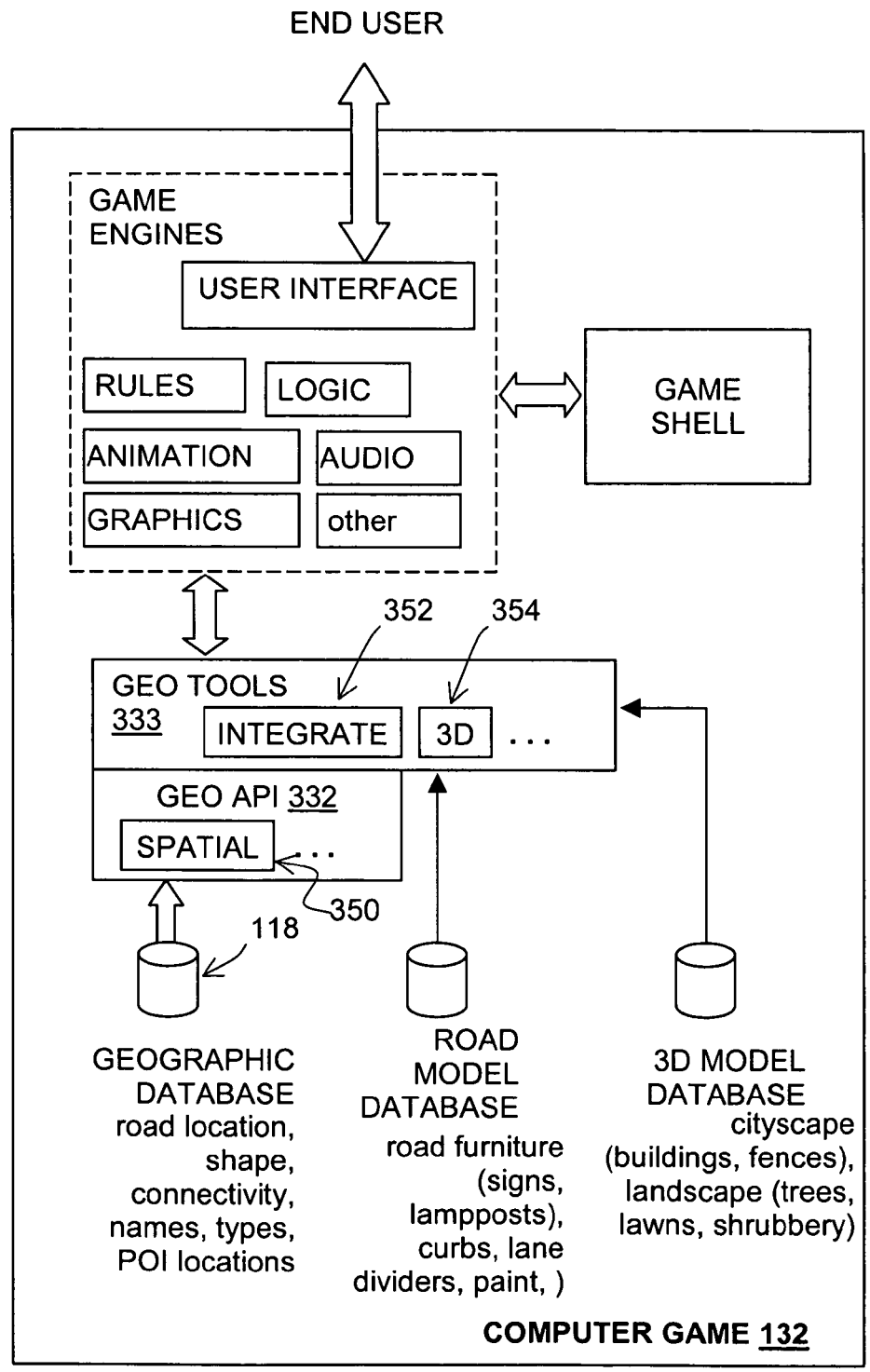
FIG. 6 is a block diagram showing components of the computer game produced by the process of FIG. 5.

FIG. 6 shows components of the computer game 132 produced by the process 300 of FIG. 5. The components in FIG. 6 were selected from the appropriate inventories during the process 300 of FIG. 5 and combined (e.g., compiled and/or linked) to form the computer game software program 132 in FIG. 6.

In FIG. 6, game engines are provided for basic game play operations, including audio, graphics, rules, logic, animation, and user interface. There may be more engines in addition to these. The engines operate in accordance with input from the game shell, which provides the characteristics of the game that uniquely identify the game. Operation of the engines is also modified by the user who provides input via a user interface of the game.

B. Geographic data API

During playing scenarios, geographic data in the game is accessed. The geographic data is obtained from the geographic database 118, which had been obtained from the map products inventory 160 during formation of the game. (Note that the geographic data may be in a different format or structure after it has been included in the computer game.) The geographic data API 332 is used by a requesting game engine to obtain needed geographic data from the geographic database. In general, the geographic data API 332 provides a structured, relatively high-level interface by which the game engines can request geographic data. In one embodiment, the geographic data API provides a set of function calls and queries in a programming language, such as C, by which the game engines can request geographic data. In one embodiment, the geographic database API 332 is similar or identical to the interface layer described in U.S. Pat. No. 6,047,280, the entire disclosure of which is incorporated by reference herein.

Among the functions provided by the geographic data API is a spatial query function 350. The spatial query function 350 returns data records of a specified type (e.g., data that represent road segments) based on location criteria included in the query. For example, a spatial query may request all the data records that represent road segments that are within 5 km of a given latitude and longitude. Another spatial query may request all the data records that represent restaurants that are within a rectangular area having specified geographic boundaries. The spatial search function 350 in the geographic data API 332 returns to the requesting component (e.g., a game engine) the data records that meet these criteria.

C. Geographic data tools

In addition to the geographic data API 332, one or more sets of geographic tools 333 are also included in the computer game 132. The geographic data tools 333 are used in combination with the geographic data API to manage and process geographic data accessed from the geographic database.

1. Integration

One of the functions provided by the geographic tools programs 333 is an integration function 352. The integration function 352 provides for associating data from the road model database with data from the geographic database 118 that represents the road network. The integration function 352 may associate road model data with specific locations along a road segment (as represented by data from the geographic database 118) or with lengths along a road segment. As an example, the integration function 352 may provide for showing curbs (using a model for what a curb looks like from the road model database) along all side streets (represented by data from the geographic database 118). In another example, the integration function 352 may provide for showing barriers along all the sides of expressways (using a model for barriers from the road model database) as represented by data from the geographic database 118. The integration function 352 may also provide for associating data models for traffic signals at intersections.

The computer game uses the integration function 352 in the geographic tools programs 333 to combine data from the road model database with data from the geographic database 118 to provide a realistic appearing road network. The road model database is not necessarily intended to represent actual road-related things, such as the exact locations of or text on signs, or the exact configuration of traffic signals, etc. Neither the geographic database 118 nor the road model database may contain information that represents the actual location of signs or the exact configuration of traffic signals. However, the road model database provides data for visually representing these road-related things in a manner that would be typical for the geographic area. So, for a residential neighborhood, the road model database would include models for sidewalks, cross walks, stop signs, etc., which would be associated with appropriate locations along the road network as defined by the geographic database 118. The integration function 352 and the road model database provide for both the density (how many signs per mile or how many lampposts per block) and the style (shape, height, sign text wording) of these road related things.

2. 3D conversion

The geographic data tools 333 also include a 3D conversion function 354. The 3D conversion function 354 supports conversion of the data obtained from the geographic database 118 so that it can be displayed as a 3D (perspective view) image. The 3D image may represent the geographic area from the point of view of the game player or may be from the point of view of another, e.g., a spectator. The view may be an overhead view.

3. Other tools

In addition to the integration function and the 3D function, the geographic tools may include other functions for handling the geographic data retrieved from the geographic database through the Geographic Data API.

V. Alternative Embodiments for Operation

The embodiments disclosed herein provide for the efficient and flexible development of a variety of different computer games. The embodiments enable developing computer games for a variety of platforms. The embodiments also provide for ways of meeting the expectations and desires of users who want different kinds of games. Further, the embodiments provide for ways of meeting the desires of users who want to choose a particular locale for a game playing scenario or change the locales. Some of the ways in which the embodiments fulfill these expectations are set forth below.

A. Selection of locales, platforms by game developer

Figure 7:
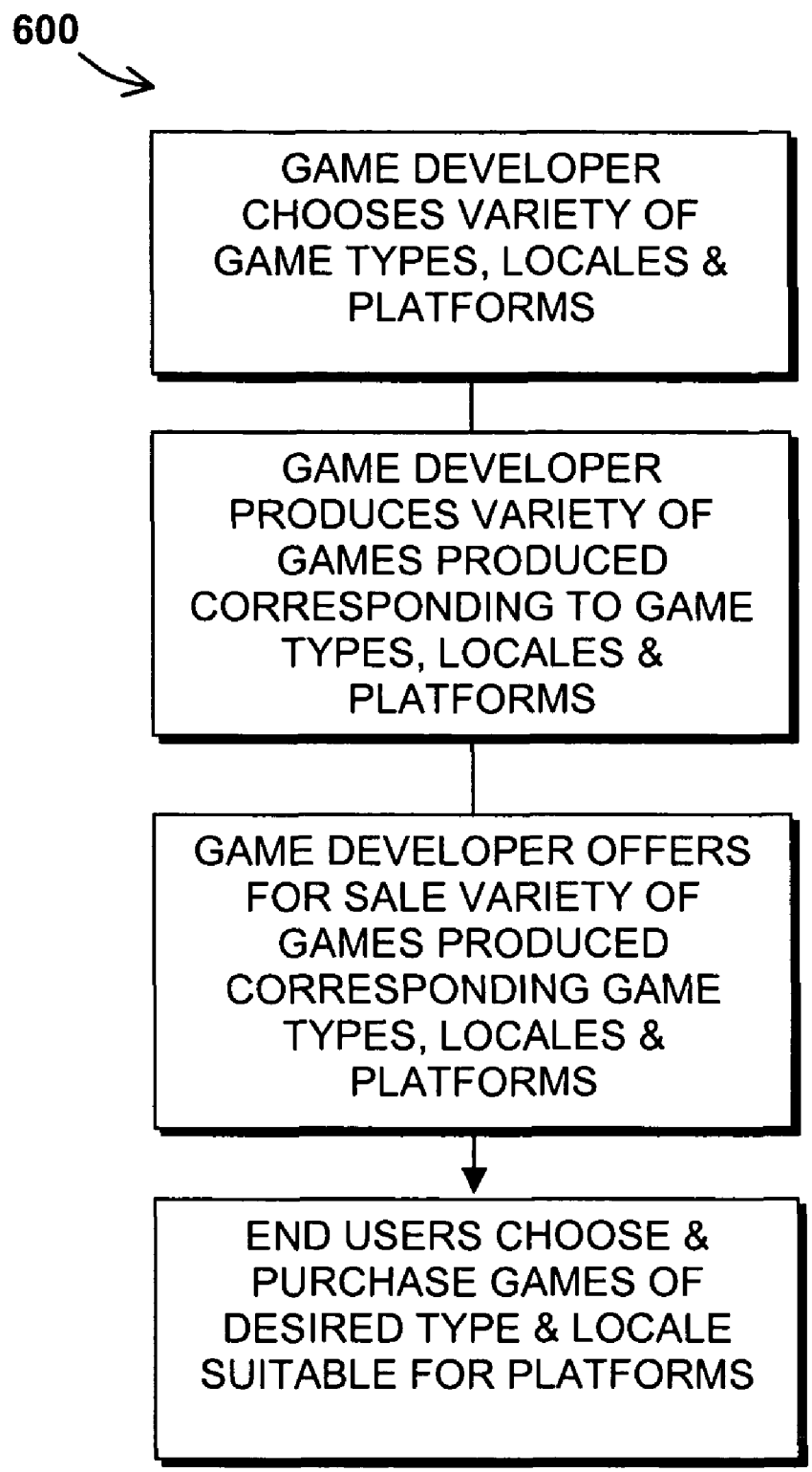
FIG. 7 is a flowchart showing an embodiment of a process for making computer games using the system of FIG. 3.

FIG. 7 is a flowchart that illustrates an embodiment 600 in which the game developer determines which computer games to produce by selecting the combinations of game types, platforms, and locales and then uses the game factory system to produce computer games based on the selections. Then, the computer game developer offers the games for sale to end users who purchase the games from the computer developer.

B. Selection of locales, platforms by end users

Figure 8:
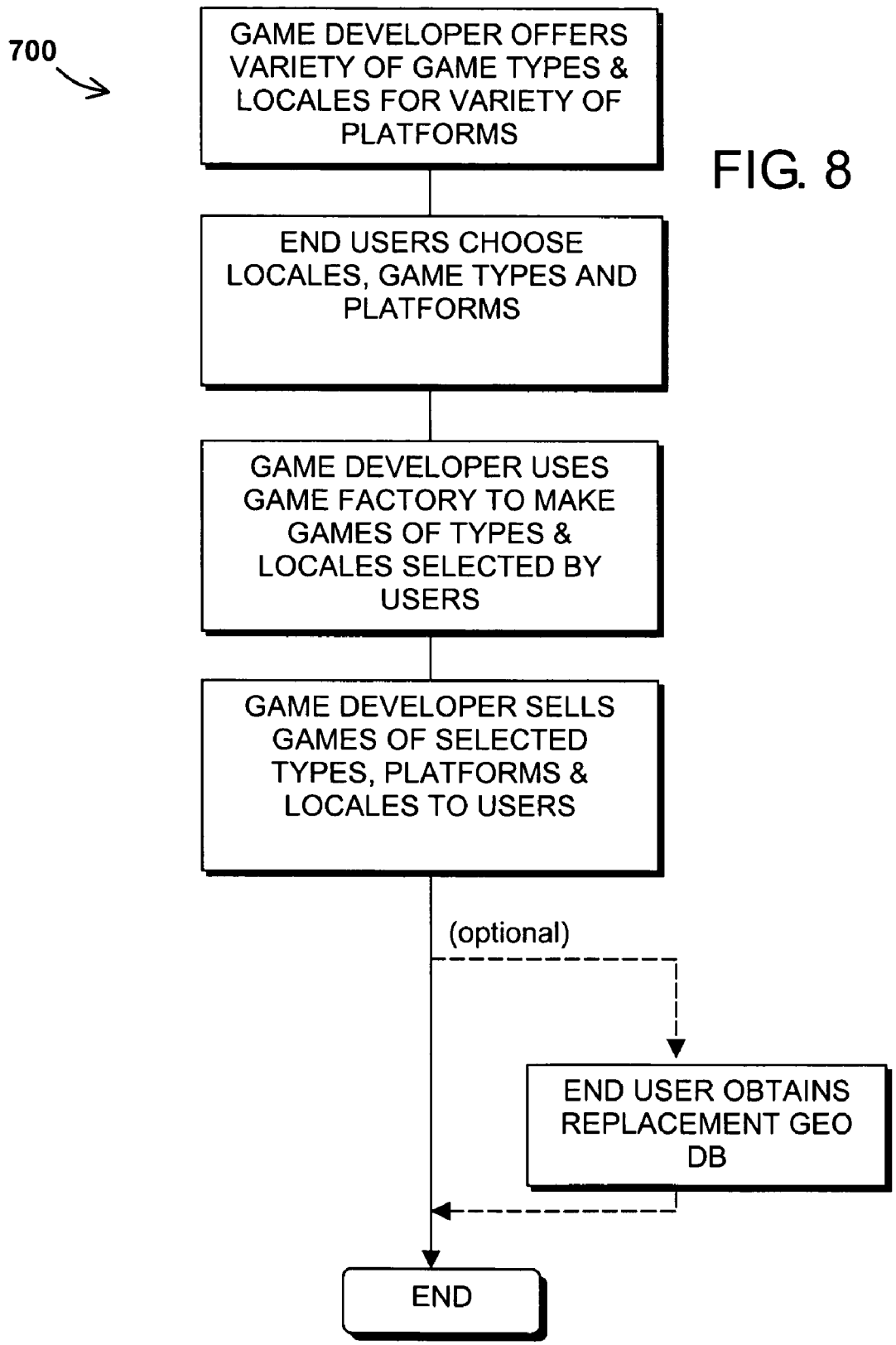
FIG. 8 is a flowchart showing another embodiment of a process for making computer games using the system of FIG. 3.

In the embodiment 700 of FIG. 8, the game developer allows each end user to choose a game type, a locale, and a platform. Then, based on the end user's selections, the computer game developer uses the game factory system to produce the computer game, which is then sold and delivered to the end user. According to one version of this embodiment, the end user may, at a later time, obtain a different set of geographic data for the previously purchased computer game. The different set of data may represent the geographic features in a different locale. The different set of data would be provided from the map products inventory in the game factory system to the end user. In the end user's computer game, the new set of geographic data would be accessed using the same geographic API and set of geographic tools programs. Changing the locale in this manner may enhance the value of the game. (Alternatively, the geographic data in the computer game may not be changeable, i.e., without replacement of the entire game.)

C. End user obtains game and geographic data separately

Figure 9:
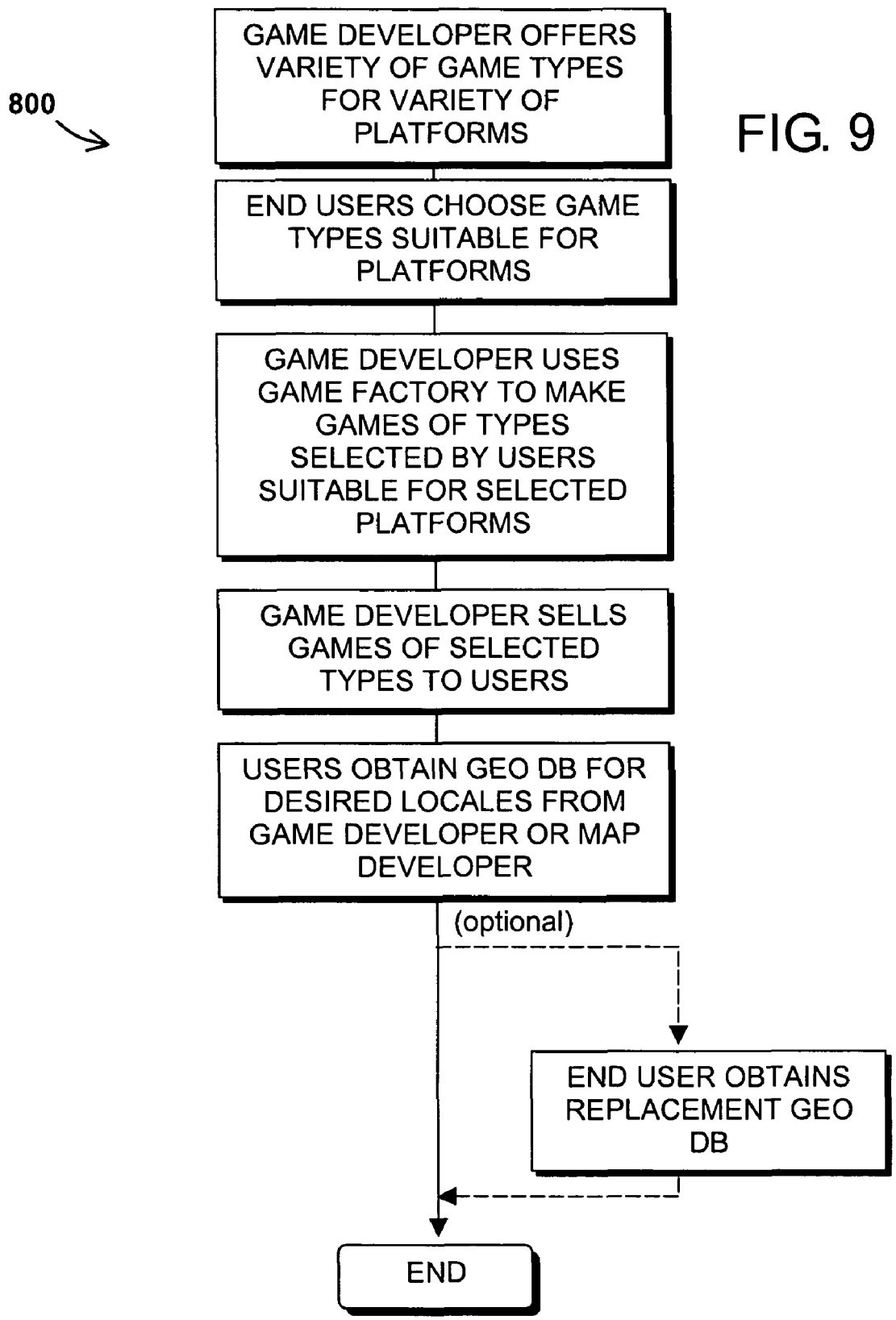
FIG. 9 is a flowchart showing yet another embodiment of a process for making computer games using the system of FIG. 3.

In the embodiment 800 of FIG. 9, the computer game developer produces the computer games, including the game engines, APIs, game tools, and game shells, but without the geographic data. Then, the user separately selects the desired locale at the time of purchase and obtains geographic data for the selected locale. The end user may obtain the geographic data from the game developer or from another source, such as the map developer. In the end user's computer game, the set of geographic data would be accessed using the geographic API and set of geographic tools programs, as described in the previous embodiments. As in the previous embodiment, one alternative enables the end user, at a later time, to obtain a different set of geographic data for the previously purchased computer game.

VI. Other Alternative Embodiments

As mentioned above, the game development system includes a map products inventory that contains maps for different locales and for different representations of the geographic features in some of the locales. Some of the different locales represented by map data products may overlap each other. For example, there may be separate map data products for Los Angeles, Calif., and the United States.

Figure 10:
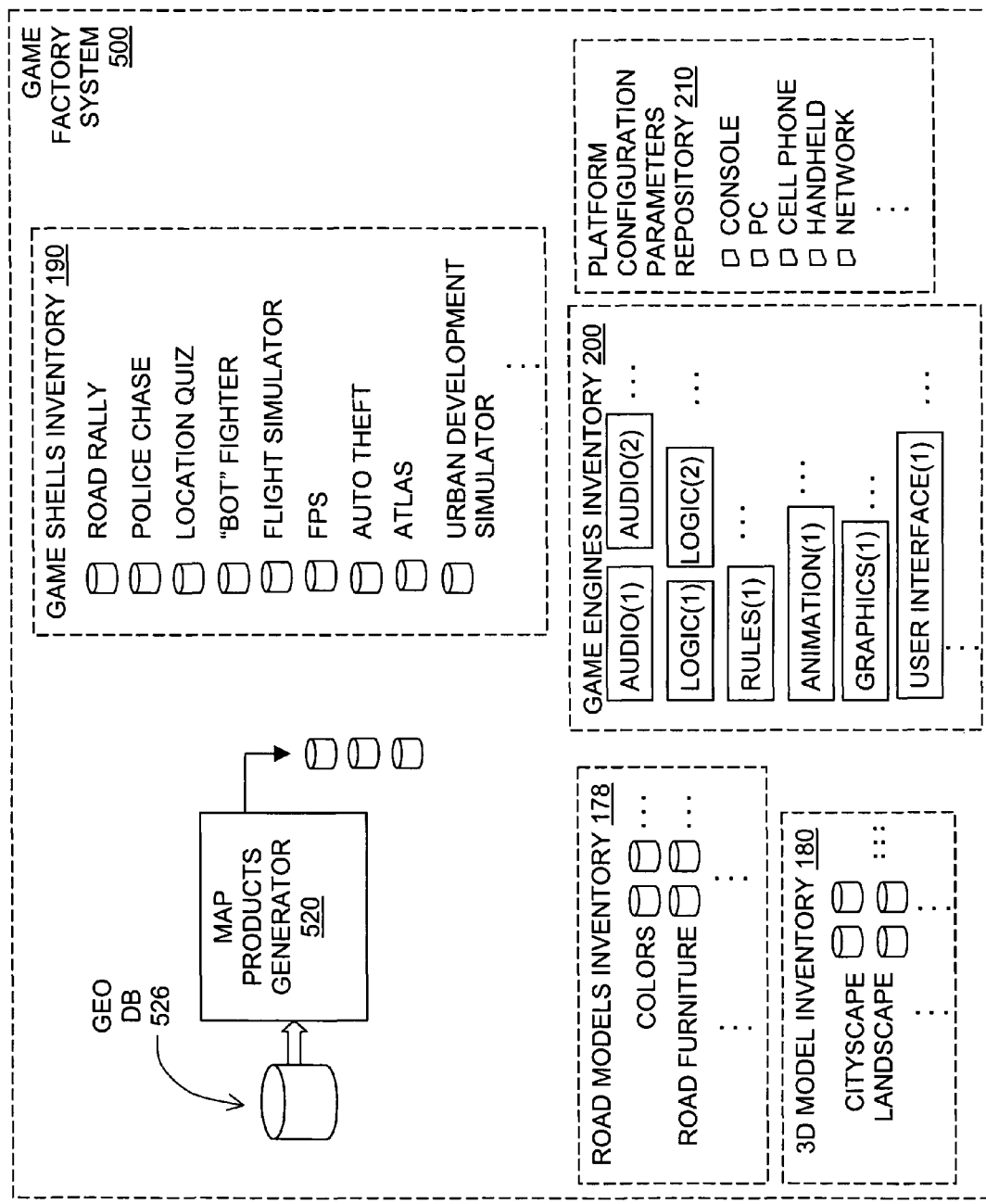
FIG. 10 is a block diagram showing components of an alternative embodiment of a system used by the computer game developer of FIG. 2 for making computer games.

In the embodiment of FIG. 3, it was described how a game factory system included a map products inventory that included a plurality of map databases that represented different geographic locales or that represented some locales differently. In an alternative embodiment, a game factory system includes a map database products generator instead of (or in addition to) having a map products inventory. An embodiment of a game factory 500 having a map products generator 520 is shown in FIG. 10. The embodiment of the game factory system 500 shown in FIG. 10 is similar to the embodiment shown in FIG. 3 and like components are indicated by the same numerals as in the previous embodiment.

In the embodiment of FIG. 10, the game factory 500 includes (or uses) a geographic database 526. The geographic database 526 may be the same as or similar to the master version 100 of the geographic database shown in FIGS. 1 and 2, or alternatively, may be a database derived from the master version 100 of the geographic database. The map products generator 520 uses data from the geographic database 526 to produce a map database product for use in a computer game during the process of creating the computer game. The embodiment of FIG. 10 has the advantage that the need to maintain an inventory of map database products is reduced. In a further alternative, the embodiment of FIG. 10 may be combined with the embodiment of FIG. 3 so that a map database products inventory is maintained that contains some products and a map generator is used to produce other map products.

The embodiments disclosed herein describe use of geographic data in computer games. The embodiments disclosed herein can be adapted for using geographic data for other non-navigation-related purposes. Among these other, non-navigation purposes are simulations and movie making. For example, the embodiments disclosed herein can be adapted for using geographic data for simulation systems. Simulation systems that can use geographic data include systems that simulate emergency operations (such as evacuation procedures or emergency vehicle deployment and routing), driver education systems, etc.

The embodiments disclosed herein can also be used in movie making. Many movies use compute-generated images of real (or imaginary) locations, instead of actual images. The embodiments disclosed herein can be adapted for creating realistic-looking geographic locations, including features such as road networks, for use in movie making. When using any of the disclosed embodiments for movie making, a relatively high visual accuracy may be required and therefore attributes that provide for relatively high visual accuracy may be needed. However, fewer attributes of some types may not be required.

The embodiments disclosed herein can be used on various different types of computer platforms, including client-server platforms and peer-to-peer platforms. The embodiments disclosed herein can be used with streaming or other technologies.

The embodiments disclosed herein may also be used for games that use geographic data obtained from multiple sources, e.g., more than one source geographic database. In these embodiments, the data from the multiple source geographic databases may be combined by the game developer or by another party.

In some of the embodiments disclosed above, it was described how a game developer could use the game factory system to make various different kinds of games, which could then be sold to end users. In an alternative embodiment, the game factory system could be provided to end users to allow the end users to make various different games for themselves.

VII. Examples

The following are examples of different types of computer games and/or applications that can be developed using the disclosed embodiments. (Note that some of the games are new and some are updates and/or improvements of prior games.)

A. City development simulation game

Geographic data that represents actual, real-world locales can be used in a type of computer game in which players simulate growth of an urban (or other regional) environment. In this kind of game, players simulate building cities or other places (such as towns, countries, rural areas) by designing roads, utilities (e.g., electrical, sewage, water) and other infrastructure elements for a geographic area. Then, the computer game allows a virtual city to develop based on the designs. The virtual cities can be detailed including individual zoning requirements (e.g., residential, commercial, industrial, etc.), crime layers (i.e., that can be changed by implementing police stations), traffic, unemployment and other realistic features.

Geographic data that represents actual, real-world locales can be used in this type of game to provide a high level of realism thereby allowing game players to build cities based on real world city models. In this type of game, players may choose a specific city model (e.g., Paris), and attempt to improve or replicate it. The inclusion of real time traffic, weather, points of interest (periodically updated or real time) and other real world content would serve to increase the realism of such a virtual city. This improvement could add realism, player loyalty, recognition, and an alternative goal to this popular type of game.

B. Virtual person development simulation game

Geographic data that represents actual, real-world locales can be used in a type of computer game in which game players simulate development of a virtual person (e.g., a "sim"). In this kind of computer game, players build a virtual person by managing that virtual person's habits, tendencies, house, family, job and interactions with other virtual people. In prior simulation games of this type, the locales in which virtual people live were non-specific. In prior simulation games of this type, the locales were modeled from the view of the player's virtual house and may have included some features specific to the game manufacturer.

Data from a source of geographic data that represents actual, real-world locales can be used in this type of game to provide a high level of realism, thereby allowing players to build virtual characters in models of real cities, with models of actual real-world points of interest, streets, landmarks and neighborhoods. When starting this type of game, which has been enhanced by the addition of geographic data that represents actual, real-world locales, a player chooses a real world city. Once the city has been chosen, neighborhoods from the city become available for the player to select (e.g., Chicago's Gold Cost, Lincoln Park, Rogers Park, River North, or specific suburbs). Once the player selects a neighborhood, the player's virtual person would be able to simulate visits to virtual attractions based on real world local attractions, e.g., go to popular restaurants and bars, work in local businesses, and reflect how life is lived in that specific area almost as if he/she were living there.

C. "Bot-fighter" game

Geographic data that represents actual, real-world locales can be used as a backbone for a "bot-fighter"-type game. This enhances the bot-fighter-type game by incorporating detailed spatial data that represents real world locales. A "bot-fighter"-type game can be played on mobile phones. In this game, players build "warrior robots" on their mobile phones using credits (e.g., virtual money) from battles won against other players. All firing between warriors is done via SMS messaging over the mobile phones. With mobile phone technology, a player may be given rough coordinates to his or her player-enemies or be warned when a player-enemy has entered his/her area or turf via mobile phone positioning technology.

The addition of geographic data that represents actual, real-world locales can give this type of game greater appeal. Specific route data and location details or spotting could be provided instead of simple proximity alerts. The addition of geographic data that represents actual, real-world locales would enable this type of game to support more precise boundaries. Further, with the addition of geographic data that represents actual, real-world locales, a game player's weapons could be given more accurate range limitations, rather than rough limitations available with existing games.

In addition, game credits (e.g., virtual money) could be spent on routes, enemy interception (based on known movements or historical patterns) courses, or enemy spotting locations.

D. Traffic management game/application

In this computer game/application, data that represents the road network in the real world is used in combination with traffic feeds and models in order to simulate a real city with its existing traffic patterns. Once a model of an actual city with its road network and traffic patterns is created, predictive modeling and comparisons to other cities allow the user to tweak, re-model, or re-design traffic architecture to improve the road network with the objective to create the most efficient traffic system or to make the most improvements to an existing system.

This computer game/application can include a vehicle fleet management feature. According to this feature, the game player is given a virtual fleet of vehicles (e.g., starting with two trucks) in an initially chosen city and an overlay of existing traffic conditions. The goal of the game with the fleet management feature would be to provide service to a customer base (i.e., based on real world businesses represented in the real world geographic database and some zoning data). Time of day for delivery, fleet routing, fuel expenditures, pickup points and schedules etc., would all be managed by the game player.

Traffic flow, incidents, bottlenecks and other traffic data would be displayed. Wired or live devices would also have the ability to add live or updated data. Traffic would be made up from individual vehicles, following typical vehicle movement patterns (e.g., gapers, cars driving down the shoulder, etc.) or could be built from scratch.

E. Emergency services and law enforcement games

Geographic data that represents actual, real-world locales can be used in emergency services scenario-type games or law enforcement scenario-type games. These games include themes related to fire fighting, medical emergency services (e.g., ambulance, search and rescue), police chases, etc. Game developers who make these kinds of games can use the disclosed embodiments to provide realistic looking locales, possibly with the addition of location-based content (e.g., actual buildings, businesses etc.), traffic, weather, points of interest, etc., as part of the playing scenarios of these games.

F. Location quiz game

Geographic data that represents actual, real-world locales can be used in a location quiz-type of computer game. In this type of game, game players are provided with clues about a game character's secret location and attempt to determine the secret geographic location. Using geographic data that represents actual, real-world locales adds a measure of realism to this type of game and increases its educational value.

One feature of this game is the ability to personalize the game to a player's locale. Players would be able to search for the secret location in their own city or neighborhood. For example, parents could use the game to teach their children how to get around in their own neighborhoods. According to this example, parents could set up the game to include the route that their child takes to and from school. Also, if a family moves to a new neighborhood, the parents could obtain up-to-date digital map data that represents the new neighborhood in order to teach their children about the new neighborhood.

Adding digital map data to the game would also provide the capability to play it anywhere the player is located. For example, a child from Chicago who is on vacation in Paris could search for the game character in Paris and thereby learn about the city.

G. Children's atlas

Another computer game/application that can use geographic data that represents actual, real-world locales is a children's atlas game/application. This computer game/application can be used by families on long car trips. In one embodiment, this game/application could be used to answer children's questions such as "Are we there yet?" or "Where are we?" with distances and times to destinations.

One version of this game includes a communications feature that allows a child to communicate with other children who have games with the same feature. Another version of this game/application allows a game player to create a virtual travelogue that describes and records travels in real time.

In one embodiment, a children's atlas game/application would be developed as a travel companion game that obtains location information from an in-vehicle navigation system or remote server. As a car in which the child is a passenger drives through a specific locale (e.g., a town or attraction) or a more general area (e.g., a state), the children's atlas application would display images and use voice narration to provide facts about the area. The children's atlas game/application would also provide well-known stories or legends about an area (e.g., Johnny Appleseed as the child is traveling through the Appalachians).

In another alternative embodiment, the children's atlas includes a travel pal feature. This feature allows a child traveling through an area to connect online with other children who located in the area. In one version of this feature, children can communicate with other traveling children or with other children located in the area a child is passing through using instant messaging. A buddy list may be formed and used for this purpose. Children could access this service while traveling or at home. For example, children could exchange information about their travels or play games. Children passing through a particular place could instant message with children living in the area and ask questions about the area, e.g., what do the locals think about the best places to eat, what is the best radio station, etc.

According to another alternative embodiment, the children's atlas application includes a virtual travelogue feature. The virtual travelogue feature allows a child to collect, store, and send information about his or her travels as a trip is taking place. The child could take information provided by the atlas game/application, annotate it with personal experiences and observations, and send it to friends and relatives, or to a home website that eventually turns into a scrapbook of the entire trip (or perhaps a report on a school field trip), complete with maps, pictures and postcards from the area, voice narration, and any other data collected along the way.

The virtual travelogue feature could also catalogue and automatically store every place the child has traveled. The child could then display or print out a map that shows all the places he or she has been and how he or she got there.

H. Simulated tour

Another application that can use geographic data that represents actual, real-world locales is a simulated tour application. This simulated tour application uses geographic data, POI data, 3D modeling, and other data, such as weather, traffic, crime statistics, and restaurant guides, to build a realistic view of a city or other locale for virtual touring. The simulated tour application could be used by people considering moving to a new area, or could be hosted by realtors, or used by travelers, or simply used by individuals to learn more about different locations.

With this application, one can learn, understand, explore, or market a specific area. This application would portray an area visually, textually, and possibly even audibly. Smells (e.g., heavy fog, chocolate factory nearby—pervasive) could be provided using appropriate technology or described textually.

One use for this application is to provide a way for a person to become familiar with driving in an unfamiliar city. Some cities may have driving conventions that are unfamiliar to some people. For example, speed limits are painted on the road in California and Hawaii whereas they are located on little signs in Illinois. According to another example, traffic is particularly aggressive in Rome and lanes are viewed as guidelines, not rules etc.

I. Car rally challenge game

Another computer game that can be improved using geographic data that represents real world places is a car rally challenge-type game. This game can be played in single player or multi-player versions. In this type of game, teams of game players travel actual routes that are sent to them from a central server. The server would store a number of car rally routes and attribute scenarios (e.g., points of interest as checkpoints) for a specific area (e.g., state, city, neighborhood, etc.), and these virtual rally instructions would be sent to the participating drivers and navigators.

An organizer's kit could also be offered that would cater to amateur car rally organizations or clubs. The kit would allow an individual or organization to create a customized car rally specific to a city or area. The rally information could be created on the rally organizer's personal computer within a program, or via download from a website. It could then be printed out and handed to the racers or downloaded to a device such as a PDA.

The difference between the game and the kit is that the game would send out pre-determined routes and rally features. The routes and features might change regularly but the players would not have a hand in planning or creating the rally scenarios. The kit would provide the basic tools and content to create a rally, thereby allowing the user to add local flavor, degrees of difficulty, or to even recreate a well-known rally course.

J. Location-based virtual monopoly game

Geographic data that represents real world places can be used in a computer game based on the Monopoly board game. In one version of this game scenario, a game player's positions and movements in the real world are tracked, using positioning equipment such as GPS, cell phone triangulation, etc. These movements would be used to define game routes for that player. Then, the routes would be used to identify properties (e.g., actual or fictional) along that route the game player could virtually purchase, rent, etc., as in the classic board game. Real world conditions, such as traffic restrictions, road construction, tolls, etc., would be factored into the game play scenario.

K. Promotional games and contests

Geographic data that represents real world places can be used for promotional concepts (e.g., contests, sales events, and so on). Businesses, such as retailers or restaurant franchises, frequently use special promotions or contests to attract business. Adding location-based data and services to these promotions would allow businesses to better target, reach, and track potential customers, and also add an extra dimension. Promotional tie-ins to location-based data could be developed using a variety of approaches.

L. Spatial simulator for exercise

Data that represents actual, real world places can be used with sports or exercise-related events or equipment. For example, geographic data can be used to enhance simulators (e.g., monitors) used on or with exercise equipment. Geographic data that represents real places can be used with a treadmill or exercise bicycle to simulate the experience of running or biking along a route. The route would be projected on a monitor or screen in front of the person on an exercise machine such as a treadmill or exercise bicycle.

Use of data that represents actual, real world places could allow users to feel as if they were running through the streets of a major city, e.g., along a marathon or 10K route, or biking the route of the Tour de France. The simulator could also be used to keep track of long-term training goals, such as running virtually across the entire United States.

A basic simulation would consist of a display of a basic overview map based on a route. For example, the user would ask for a route within a city and a basic map would be displayed showing the streets of the city with a mark on the map indicating the virtual position of the runner or bicyclist. The runner's progress along the route would be based on the runner's pace. The degree or category of simulation offered could vary depending on the level of realism desired. For example, details such as road elevation could be added to the simulation. This would allow the person exercising to experience the feeling of running or biking in the Rocky Mountains or through the plains of Nebraska.

A detailed simulation would use 3D data and give a full picture on a monitor of the buildings and landmarks along the route. This would give the runner or bicyclist a realistic feeling of running or biking along the route.

M. Classic computer games

Geographic data that represents actual, real-world locales can be advantageously used to make new versions of classic computer games like Snake and Pacman. In these new versions of these games, game players assume the identities of characters in the game. A player uses positioning equipment that determines the player's actual physical positioning the real world. The player also has equipment that provides for wireless communication with a central database. This player becomes a virtual player in a classic game such as PacMan or Snake. The games would be played in either an online competitive mode or a single player (player versus machine) mode. In either case, the player acts as a character in the game. The distance and speed moved by the player would be translated to movement and speed in a virtual world, where the player may accomplish goals within the game or defeat other players. The system would be set up in translated "virtual boards" where a game would consist of an area regulated by the speed of transportation (a "board" for a vehicle can be significantly larger than one for a pedestrian).

N. Location based cannonball run car racing game

Another computer game that can use embodiments of the disclosed system and method for providing geographic data is a "cannonball run" car racing game. This game may be played in multi-player or single player mode. The multi-player mode game may be played online. In the game playing scenario, players compete against each other to race vehicles (e.g., cars, bikes, etc.) across a geographical area. Data that represent actual, real-world places would be used to add realism to the game, e.g., actual legal and physical restrictions. Alternative features include the addition of real-time traffic and weather conditions.

One scenario for a multi-player online version of the game would feature a community where players start out with a specific mode of transportation. This version of the game would provide an online culture and goal of being with the best group and driving the best vehicle. Players would start with a certain amount of virtual cash and a basic vehicle. Some races would be pre-defined events, whereas other races would be random city races with a user defined start and end points. The selection of routes for races would be based on real map data. The game would be based on winning virtual money by winning races, but winning a race could cost the player due to traffic tickets, illegal traffic maneuvers or other expenses. All fines would be based on legal restriction data and statistics of the percentage of drivers caught. Suggested routes would be provided in all races, and the amount of virtual cash used to buy a route would vary the quality or speed of the route.

Game players would have the option of racing through their hometowns, or through the streets of their favorite cities or countries all over the world. These would attract a larger demographic, and interest the casual game player as well.

O. Virtual trip planner and simulation

Data that represents actual, real world places can be used for a computer simulation application that would allow a user to preview a trip or specific route by virtually driving it on his or her personal computer or game console. The simulation would be based on a representation of the geographic database that included 3D renderings of buildings, signs, topographical features, and other related attributes. The simulation software could be provided on media, through an online vendor, or rented to users on an as-needed basis. Users would enter a route request via their personal computers or consoles and could use gaming steering wheels, joysticks, voice commands, or keyboards to drive the routes. A fast forward function could be used to skip the obvious or mundane sections of the trip or to speed up the pace.

To make the simulation more realistic, traffic features, such as vehicles coming and going on the route, could be included.

These could perhaps even be based on actual traffic patterns or real-time traffic for a selected time of day.

A feature of this simulation application would be as a form of trip planner. The planner would provide information about an area to which one is traveling, such as local history, area specific trivia games, and point of interest descriptions and recommendations. Users would have the option of using this information while driving the area in advance (e.g., using the simulation application, described above), printing out the planner in advance as a reference, or loading it onto a device and accessing it during an actual trip (e.g., going on a long trip and using the planner interactively to keep children amused and informed). For example, if a family was traveling on vacation from Chicago to Miami by car, the parents could research and preview the attractions, hotels, and restaurants at which the family may want to stop along the way. They could also preview the route and create their own form of trip ticket to plan the best route. The parents could then set up an itinerary that would include games, information, quizzes etc., that would occupy the children throughout the trip.

It is intended that the foregoing detailed description be regarded as illustrative rather than limiting and that it is understood that the following claims including all equivalents are intended to define the scope of the invention.

We claim:

1. A method of making computer games, the method comprising:
   selecting, by a game developer, from an inventory of map database products, a map database that contains data that represents a road network located in a real-world geographic area to be depicted as part of a playing scenario of a computer game, wherein the data that represents the road network includes geographic coordinates of positions of roads and turn restrictions at intersections of the roads, and wherein the map database products are provided by a map developer separate from the game developer;
   selecting, by the game developer, from a game shells inventory a game shell data structure that includes basic logic, rules, strategy, and characters for the computer game;
   combining, by the game developer, the map database and the game shell data structure in a computer game product; and
   providing the computer game product to an end user separate from the game developer and the map developer.

2. The method of claim 1 further comprising:
   selecting from an inventory of road models, road models data that contains data representations used for visual appearance and rendering of road-related things.

3. The method of claim 2 wherein the road-related things include at least one selected from a group consisting of: road colors, road pavement, lane stripes, curbs, sidewalks, signs, lampposts, lane dividers, traffic signals, speed bumps, and crosswalks.

4. The method of claim 1 further comprising:
   selecting from an inventory of 3D models, 3D models data that contains data representations used for visual appearance and rendering of cityscape and landscape-related things.

5. The method of claim 4 wherein the cityscape and landscape-related things include at least one selected from a group consisting of: buildings, fences, trees, shrubbery, lawns, fences, clouds, and scenery.

6. The method of claim 1 further comprising:
   selecting game engines from an inventory, wherein the game engines are programs that perform specific tasks and operate on an as-needed basis during game play.

7. The method of claim 6 wherein the game engines include at least one selected from a group consisting of: audio engines, logic engines, rules engines, animation engines, graphics engines, and user interface engines.

8. The method of claim 1 further comprising:
   combining the map database and the game shell data structure with a geographic application programming interface in the computer game product.

9. The method of claim 8 wherein the geographic application programming interface includes a set of queries by which game engine components in the computer game can request geographic data from the map database.

10. The method of claim 8 wherein the geographic application programming interface provides for spatial queries for geographic data from the map database by components of the computer game.

11. The method of claim 1 further comprising:
    combining the map database and the game shell data structure with geographic data tools programs in the computer game product.

12. The method of claim 11 wherein the geographic data tools programs include an integration function that combines road model data with data from the map database.

13. The method of claim 11 wherein the geographic data tools programs include a 3D conversion function that provides for conversion of data from the map database for presentation in a perspective view.

14. The method of claim 1 further comprising:
    referring to parameters associated with a platform on which the computer game will be installed, wherein the parameters are obtained from a repository that contains a plurality of sets of parameters associated with different computer platforms.

15. The method of claim 14 wherein the repository includes sets of parameters associated with computer platforms selected from a group consisting of: personal computers, game consoles, cell phones, hand held devices, and networks.

16. The method of claim 1 wherein the game shells inventory includes basic logic, rules, strategy, and characters for a type of computer game including a road rally game, a police chase game, a location quiz game, a "bot" fighter game, a flight simulator game, a "first-person-shooter" game, an auto theft game, and an urban development simulator game.

17. The method of claim 1 wherein the inventory of map database products includes map databases that represent different locales.

18. The method of claim 17 wherein the different locales include cities, states, and countries.

19. The method of claim 1 wherein the inventory of map database products includes map databases that represent the real-world geographic area for different purposes, wherein the map databases include:
    the selected map database containing the data representing the road network including data representing expressways;
    a pedestrian map database containing data corresponding to pedestrian travel including data representing hiking trails;
    a bicycle map database containing data corresponding to bike travel including data representing bike paths; and
    an aircraft map database containing data corresponding to aircraft travel including data representing airport runways,
    wherein the selected map database excludes the data representing the hiking trails and the airport runways, wherein the pedestrian map database excludes the data representing the expressways and the airport runways, wherein the bicycle map database excludes the data representing the expressways and the airport runways, and wherein the aircraft map database excludes the data representing the hiking trails.

20. The method of claim 1 wherein the inventory of map database products includes map databases that represent a locale with different levels of accuracy.

21. A computer game factory system comprising:

a map products inventory that contains a plurality of map data products, wherein the map data products represent separate real-world geographic locales to be represented during playing scenarios of the computer games, and wherein a portion of the map data products include navigation-related attributes including geographic coordinates of positions of roads, street names of the roads, and turn restrictions at intersections of the roads;

a game shells inventory that contains data structures that includes basic logic, rules, strategy, and characters for a type of computer game including a road rally game, a flight simulator game, a "first-person-shooter" game, and an urban development simulator game; and a program that combines one of the map data products and one of the data structures from the game shells inventory to produce a computer game, wherein the portion of the map data products are derived from a database suitable for vehicle navigation on roads in the respective real-world geographic locales.

22. The system of claim 21 further comprising:

a road models inventory that contains data representations used for visual appearance and rendering of road-related things, wherein the program combines one of the data representations used for visual appearance and rendering of road-related things with the one of the map data products and the one of the data structures from the games shells inventory to produce the computer game.

23. The system of claim 21 further comprising:

a 3D models inventory that contains data representations used for visual appearance and rendering of cityscape and landscape-related things, wherein the program combines one of the data representations used for visual appearance and rendering of cityscape and landscape-related things with the one of the map data products and the one of the data structures from the games shells inventory to produce the computer game.

24. The system of claim 21 further comprising:

a game engines inventory that contains software engine programs that perform specific, regularly performed tasks and that operate on an as-needed basis during game play; wherein the program combines software engine programs with the one of the map data products and the one of the data structures from the games shells inventory to produce the computer game.

25. A method of facilitating development of computer games, the method comprising:

selecting, by a map developer, a locale input indicating a real-world geographic locale;

selecting, by the map developer, a type input indicating a type of data selected from a group consisting of: auto, pedestrian, bicycle, and aircraft;

selecting, by the map developer, an accuracy level input indicating a level of detail of data;

querying, by the map developer, a master geographic database as a function of the locale input, the type input, and the accuracy level input, the master geographic database produced by the map developer and containing data representing a plurality of road segments corresponding to roads of a real-world locale, wherein the data representing the plurality of road segments are configured to be compiled for navigation-related functions in a navigation device, the data representing the plurality of road segments include navigation-related attributes, the navigation-related attributes include (i) geographic coordinates, (ii) street names, (iii) address ranges, (iv) turn restrictions, and (v) road connectivity;

retrieving, by the map developer, map data from the master geographic database based on the query, the map data being the selected type of data representing the selected real-world geographic locale at the selected level of detail; and providing, by the map developer, the map data to a separate game developer to produce a computer game based on the map data.

* * * * *